United States Patent
Xu et al.

(10) Patent No.: US 9,860,734 B2
(45) Date of Patent: Jan. 2, 2018

(54) METHOD AND DEVICE OF SUPPORTING GROUP MOBILITY

(71) Applicant: Samsung Electronics Co., Ltd., Suwon-si, Gyeonggi-do (KR)

(72) Inventors: Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 14/354,784

(22) PCT Filed: Nov. 4, 2012

(86) PCT No.: PCT/KR2012/009603
§ 371 (c)(1),
(2) Date: Apr. 28, 2014

(87) PCT Pub. No.: WO2013/073836
PCT Pub. Date: May 23, 2013

(65) Prior Publication Data
US 2014/0286312 A1     Sep. 25, 2014

(30) Foreign Application Priority Data

Nov. 14, 2011  (CN) .......................... 2011 1 0358555
Jan. 13, 2012  (CN) .......................... 2012 1 0011538

(51) Int. Cl.
*H04W 8/02*     (2009.01)
*H04W 36/00*    (2009.01)
*H04W 84/04*    (2009.01)

(52) U.S. Cl.
CPC ......... *H04W 8/02* (2013.01); *H04W 36/0016* (2013.01); *H04W 36/0061* (2013.01); *H04W 36/0033* (2013.01); *H04W 84/047* (2013.01)

(58) Field of Classification Search
CPC .............. H04W 8/02; H04W 36/0016; H04W 36/0061; H04W 36/0033; H04W 84/047
See application file for complete search history.

(56) References Cited

U.S. PATENT DOCUMENTS

| 2010/0120399 A1* | 5/2010 | Guo ................. H04L 29/12207 455/411 |
| 2010/0210269 A1 | 8/2010 | Shuai |

(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN), 3GPP TS 36.300, Sep. 2011, pp. 1-194, V10.5.0, Valbonne, France.

(Continued)

*Primary Examiner* — Walter Divito
(74) *Attorney, Agent, or Firm* — Jefferson IP Law, LLP

(57) ABSTRACT

A communication method is provided. The communication method includes receiving, by a Mobile Management Entity (MME), information accessed by a User Equipment (UE) through a Relay Node (RN), and sending, by the MME, a Tracing Region Identification (TAI) list of an RN cell where the UE is located to the UE. A network device and an access network device are further provided. By sending a TAI list of an RN cell to the UE, when TAI(s) of the cell are contained in the TAI list of the relatively stationary UE, the UE does not need to initiate an uplink TAU process, and thereby unnecessary signaling and network jamming can be reduced, and at the same time, paging efficiency and network performance can be improved.

18 Claims, 12 Drawing Sheets

(56) References Cited

U.S. PATENT DOCUMENTS

| | | | | |
|---|---|---|---|---|
| 2010/0267405 A1* | 10/2010 | Chin | .................... | H04W 48/12 |
| | | | | 455/500 |
| 2011/0032871 A1* | 2/2011 | Xu | ........................ | H04W 60/00 |
| | | | | 370/328 |
| 2012/0202491 A1* | 8/2012 | Fox | ...................... | H04B 7/2609 |
| | | | | 455/435.1 |
| 2012/0214520 A1* | 8/2012 | Bergqvist | .............. | H04W 68/02 |
| | | | | 455/458 |
| 2013/0176890 A1* | 7/2013 | Sharma | .............. | H04B 7/15557 |
| | | | | 370/252 |
| 2014/0204901 A1* | 7/2014 | Hedman | ........... | H04W 36/0022 |
| | | | | 370/331 |

OTHER PUBLICATIONS

Raimo Kantola et al., Performance of Handover in Long Term Evolution, Jan. 11, 2011, pp. 1-76.

\* cited by examiner

METHOD AND DEVICE OF SUPPORTING GROUP MOBILITY

CROSS-REFERENCE TO RELATED APPLICATION(S)

This application is a U.S. National Stage application under 35 U.S.C. §371 of an International application filed on Nov. 14, 2012 and assigned application number PCT/KR2012/009603, which claimed the benefit of Chinese patent applications filed on Nov. 14, 2011 and Jan. 13, 2012 in the Chinese Intellectual Property Office and assigned Serial numbers 201110358555.X and 201210011538.3, respectively, the entire disclosure of each of which is hereby incorporated by reference.

TECHNICAL FIELD

The present disclosure relates to mobile communication field. More particularly, the present disclosure relates to a method and device of supporting group mobility.

BACKGROUND

The modern mobile communication increasingly provides omni-directional high quality service to users, and $3^{rd}$ Generation (3G) technology has occupied the main research field of the current communication field. The 3G Partner Project (3GPP) is devoted to take a Long Term Evolution (LTE) system to be evolution of the 3G system.

FIG. 1 is a structural schematic view of an LTE system supporting Relay Node (RN) according to the related art.

Referring to FIG. 1, in a radio access network of a LTE system, a radio resource management entity comprises a macro base station, such as evolved Node B (eNB) 101, and a Relay Node (RN) 102 which accesses a core network by another macro base station, such as Doner eNB (DeNB) 103, wherein eNBs are connected to one another through an X2 interface, and each of eNBs is respectively connected with a Mobile Management Entity (MME) and a Serving Gate-Way (S-GW) 104 through a S1 interface; and RN 102 accesses DeNB 103 through a Un interface. The DeNB 103 provides an X2 proxy function between RN 102 and another eNB. The DeNB 103 provides a S1 proxy function between the RN 102 and the MME/S-GB 104. The proxy function of the S1 and X2 includes X2 and S1 signaling specially used in transferring User Equipment (UE) between RN 102 and eNB 101, between RN 102 and MME 104, and between RN 102 and S-GW 104.

The present RN is used to support an immobility position rather than supporting mobility between different cells. A problem confronted by operators is that in a high-speed railway, such as a train that runs at a 250-350 km/h, the service quality of the present RN is not satisfied with the requirements of the operators, such as high noise, great penetration loss, serious Doppler Frequency shift, and low handover success rate and the like. For these purposes, the operators provide a research project about a mobile RN. The mobile RN directs to address the problems existing in the RN to improve service quality in the high-speed railway for a good satisfaction with the users' requirements.

A process of a Tracing Area Update (TAU) in the LTE system is described below with reference to FIG. 2.

FIG. 2 is a TAU flow diagram according to the related art.

Referring to FIG. 2, the TAU flow comprises the following operations.

In operation 201, a UE sends a TAU request message to an eNB. Specially, a UE sends a TAU request to an eNB through a Radio Resource Control (RRC).

In operation 202, the eNB sends a TAU request message to MME through S1.

In operation 203, a new MME obtains an address of an existing MME according to a Global UE Temporary Identifier (GUTI) received by the UE. A new MME sends a context request to the existing MME so as to request the context information about the UE.

In operation 204, the existing MME sends a context response message to the new MME.

In operation 205, executing a process of authentication and certification to the UE. Such process is selectable and executed under certain circumstances.

In operation 206, the new MME sends a context confirmation message to the existing MME.

In operation 207, the MME sends a modification bearer request message to the S-GW/Packet Data Network Gateway (PDN GW). Herein, a detailed description of the operations between the S-GW and the PDN GW is omitted.

In operation 208, S-GW/PDN GW sends the modification bearer response message to the MME.

In operation 209, the MME sends an update location request to a Home Subscriber Server (HSS).

In operation 210, the HSS sends a cancel location to the existing MME.

In operation 211, the existing MME sends a cancel location confirmation message to the existing HSS.

In operation 212, the HSS sends an update location confirmation message to the MME.

In operation 213, the MME sends a TAU accepting message to the UE.

In operation 214, if the GUTI is changed, the UE sends a TAU accomplishment message to the MME to confirm acceptance of the new GUTI.

As illustrated in the TAU process mentioned above, several messages are used for each UE to execute a TAU process every time. When the train runs at a high speed, both RN and UE are moving, if a plurality of UEs execute the TAU process at the same time, it will bring about an unnecessary waste of network resources and jam the network.

Therefore, there is a need to provide an effective technical solution in order to address the problem that the UE frequently executes a TAU process.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to effectively reduce a process in which a plurality of User Equipments (UEs) frequently executes a Tracing Area Update (TAU) by sending a TAI list of a Relay Node (RN) cell to which the UE is located to the UE.

In accordance with an aspect of the present disclosure, a communication method is provided. The method includes receiving, by a Mobile Management Entity (MME), information accessed by a User Equipment (UE) through a Relay Node (RN), and sending, by the MME, a Tracing Area Identification (TAI) list of an RN cell where the UE is located to the UE.

In accordance with another aspect of the present disclosure, a communication method is provided. The method includes sending, by an access network device, information accessed by a UE through an RN to an MME, and sending, by the access network device, a non-access stratum message received from the MME to the UE, the non-access stratum message including a TAI list of an RN cell where the UE is located.

In accordance with another aspect of the present disclosure, a network device is provided. The network device includes a reception module configured to receive information accessed by a UE through an RN, a storage module configured to record the information, and a transmission module configured to send a TAI list of an RN cell where the UE is located.

In accordance with another aspect of the present disclosure, an access network device is provided. The access network device includes a reception module configured to receive the information accessed by the UE through an RN, and a transmission module configured to send the information accessed by the UE through the RN to a MME, and to send a non-access stratum message received from the MME to the UE, the non-access stratum message including a TAI list of an RN cell where the UE is located.

The above method or device according to present disclosure sends a TAI list of an RN cell to the UE, so that when the TAI of the cell where many relative stationary UE are located is contained in the TAI list of the UE, the UE does not need to initiate an uplink TAU process in order to reduce unnecessary signaling and network jamming, and simultaneously to improve paging efficiency for effectively promoting network performance. The above technical solutions according to the present disclosure are an alternation to the related-art system. Thereby the compatibility of the system may not be affected and the system can achieve a simplicity and be highly active.

Additional aspects and advantages of the present disclosure will be set forth in part in the description which follows, and will be apparent upon illustration of the following or may be learned from the practice of the disclosure.

According to the aforementioned method or device, by sending a TAI list of an RN cell to the UE, when the TAI of the cells where a plurality of relatively stationary UEs are located is within the TAI list of the UE, the UE does not need to initiate an uplink TAU process, the present disclosure can reduce unnecessary signaling and network jamming, and simultaneously improve paging efficiency and effectively promote the network performance.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
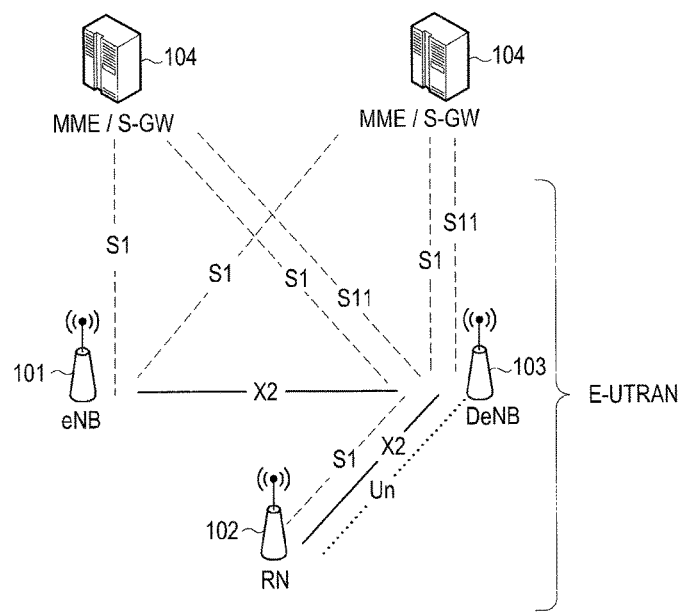
FIG. 1 is a structural schematic view of Long Term Evolution (LTE) system supporting a Relay Node (RN) according to the related art.
Figure 2:
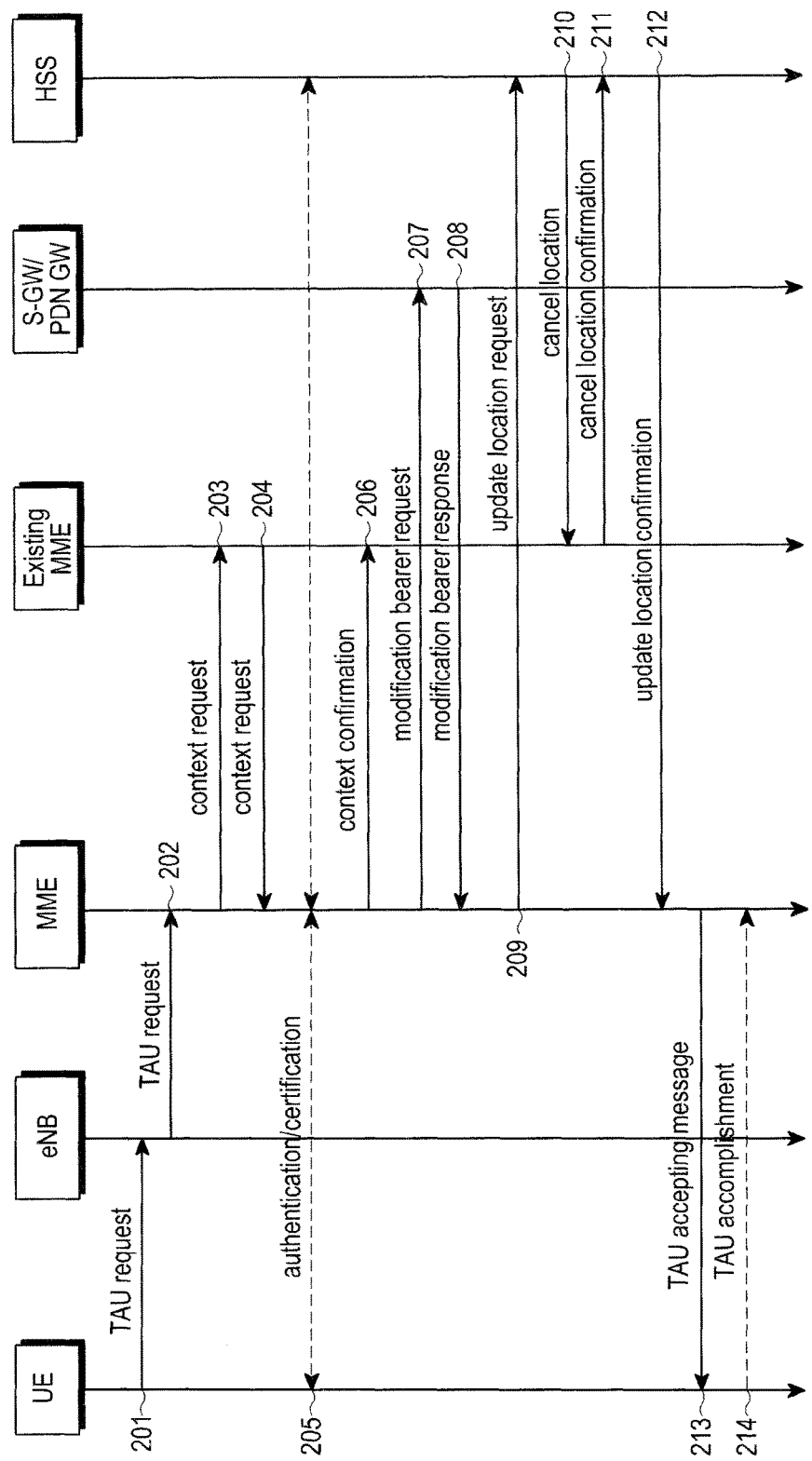
FIG. 2 is a Tracing Area Update (TAU) flow diagram according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Generally, a Relay Node (RN) is regarded as a fixed access network device. However, with the current expansion of the application context, an RN with a mobile feature may be referred to as a mobile RN, for example, the RN mounted on a high-speed railway. Nevertheless, the term RN may be inclusive of both a stationary RN and a mobile RN.

The present disclosure provides a technical solution adaptive to the related-art RN device, and even to the mobile RN. Considering the characteristic of the mobile RN, the technical solution of the present disclosure can reduce unnecessary signaling and network jamming simultaneously to improve paging efficiency and effectively to promote network performance. Therefore, the RN mentioned in the present disclosure is the traditional fixed RN and/or a mobile RN, the details of which will not be presented any further for convenience in description.

Referring to the RN mounted on the high-speed railway, for example, a cell of the RN is provided with a unique Tracking Area Code (TAC) along the highway, and the RN supports all Public Land Mobile Networks (PLMNs) along the highway. For instance, a Tracing Area Identification (TAI) of the RN can be a combination of all PLMN IDentifiers (IDs) supported along the highway and a TAC. In addition, if a plurality of RNs is provided in the same train, the RNs with the same TAC may be distributed to connect to the same Donor evolved Node B (DeNB). To achieve an aspect of the present disclosure, a technical solution of supporting the UE group mobility is provided, for example, it can be applied in a circumstance of high-speed movement in order to reduce unnecessary signaling and network jamming.

According to one embodiment of the present disclosure, a communication method comprises the following operations. A Mobile Management Entity (MME) receives information accessed by a User Equipment (UE) through an RN, and the MME sends a TAI list of an RN cell where the UE is located to the UE.

When the UE groups are moving, for example, during the train runs at a high speed, a TAI of a cell where a plurality of relatively stationary UEs are located is contained in a TAI list of the UEs, thereby a TAU process shall not be initiated by the UE which can reduce unnecessary signaling and a network jamming simultaneously to improve a paging efficiency and to effectively promote a network performance.

Figure 3:
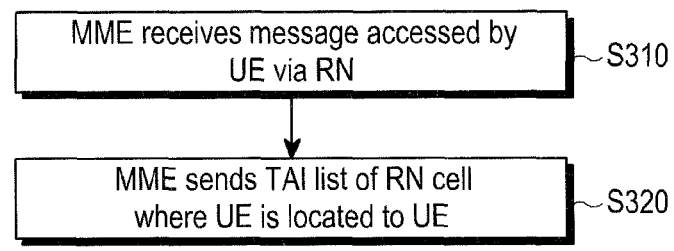
FIG. 3 is a flowchart of a communication method according to an embodiment of the present disclosure.

FIG. 3 is a flowchart of a communication method according to an embodiment of the present disclosure.

Referring to FIG. 3, the communication method comprises the following operations.

In operation S310, a MME receives information accessed by a UE through an RN.

Specifically, the operation of the MME receiving the information accessed by a UE through an RN comprises the MME receiving the information accessed by the UE through the RN as reported by the RN or the DeNB, wherein the accessed information includes one or more of an indication of the RN or the mobile RN, an identity of the RN, and a TAI list supported by the RN.

It may be that an RN directly reports the information accessed by the UE through the RN to the MME. For example, the RN informs the MME of the information accessed by the RN through an initial UE message. Through the establishing process of the S1 between the RN and the MME, the MME obtains the TAI list supported by the RN.

The DeNB obtains the information accessed by a UE through an RN in the following one or more approaches: an initial UE message initiated by the RN to which the UE belongs; a handover request confirmation message initiated by the RN to which the UE belongs; a handover informing message initiated by the RN to which the UE belongs; a path switch request message initiated by the RN to which the UE belongs; a S1 establishing process initiated by the RN to which the UE belongs; a connecting process of the RN initiated by the RN to which the UE belongs; an RN instruction contained in the handover request confirmation message by the RN to which the UE belongs; and a determination of whether the cell currently accessed by the UE is the RN cell according to an initial configuration.

The MME records the information accessed by the UE through the RN.

The MME may further store a DeNB of the RN where the UE is located.

The MME obtains information accessed by the UE through an RN and/or the DeNB of the RN where the UE is located. Therefore, when a network provides service for the UE, the MME can find out the position of the UE quickly.

In operation S320, the MME sends a TAI list of an RN cell where the UE is located to the UE.

In order to avoid TAU processes initiated by multiple UEs which keep stationary relative to the RN when the UE groups are moving, for example, during the train runs at a high speed, a TAI list of an RN cell where the UE is located is sent to the UE. Thus, when the TAI of the cell where multiple relatively stationary UEs are located is contained in the TAI list of the UEs, an uplink TAU process shall not be initiated by the UEs. Thus, it can reduce unnecessary signaling and network jamming simultaneously to improve a paging efficiency and to promote a network performance.

The embodiment according to the present disclosure provides the following three procedures for paging the UE.

In the first procedure, the MME sends a paging 1 message to the DeNB of the RN where the UE is located; the DeNB sends the paging 2 message to the RN which supports a TAC or a TAI in TAI in the paging message received from the MME; and the RN sends a paging message to the UE. Alternatively, the RN sends a paging 3 message to the UE in the cell in the TAI received from the DeNB.

In addition, in the establishing process of the S1 interface, the DeNB receives a report from the RN to obtain the TAI list supported by the RN. The MME receives report information from the DeNB to obtain the TAI list supported by the DeNB or the TAI list supported by the RN under the DeNB.

In the second procedure, the MME sends a paging 1 message to an evolved Node B (eNB) which supports the TAI in the TAI list sent to the UE; the eNB sends the paging 2 message to the RN or the eNB cell which supports the TAC or the TAI in the TAI list in the paging message received from the MME; and the RN sends a paging 3 message to the UE. Alternatively, the RN sends a paging 3 message to the UE in the cell in the TAI received from the DeNB.

In addition, in the establishing process of the S1 interface, the DeNB receives a report from the RN to obtain the TAI list supported by the RN; and the MME receives report information from the DeNB to obtain the TAI list supported by the DeNB.

In the third procedure, the MME sends a paging 1 message to the RN or eNB which supports the TAI in the TAI list sent to the UE; and the RN or the eNB sends the paging 2 message to a cell which is in the TAC or the TAI in the paging message received from the DeNB or the MME.

When the UE departs from the RN, the following operations occur. The MME updates the information accessed by the RN where the UE is located, and sends a updated TAI list to the UE.

If the information about the DeNB of the RN accessed by the UE is changed at the moment of the RN switching, the MME or a relocated MME stores updated information about the DeNB accessed by the RN where the UE is located. Generally, the initial MME is defined as a Source MME (S-MME), and the relocated MME is defined as a Target MME (T-MME). When a source MME receives information about switching the RN where the UE is located, the source MME sends the information about the UE served by the RN to a target MME; and the target MME updates the DeNB accessed by the RN where the UE is located as the target DeNB.

If the information about the UE is changed at the moment of the RN switching, the MME or the relocated MME may send an updated information to the UE.

The operation of the MME or the relocated MME sends the updated information to the UE comprises the following operations. A Non Access Stratum (NAS) message is sent which includes the updated information to the UE; or a S1 message is sent to the DeNB and the DeNB sends the updated information to the UE through the RN.

When the TAI of the cell where multiple relatively stationary UEs are located is contained in a TAI list of the UEs, the uplink TAU processes shall not be initiated by the UEs by sending a TAI list of an RN cell where the UE is located to the UE, so that it enables the reduction of the unnecessary signaling and a network jamming simultaneously to improve the paging efficiency and to promote the network performance.

Figure 4:
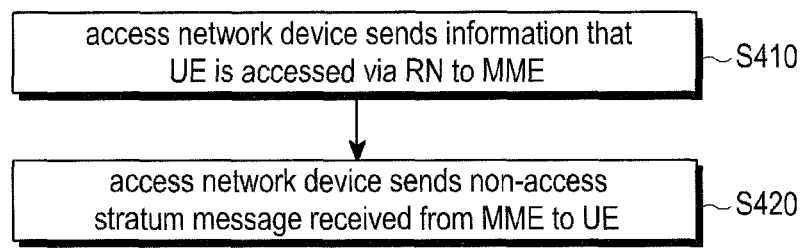
FIG. 4 is a flowchart of another communication method according to an embodiment of the present disclosure.

FIG. 4 is a flowchart of another communication method according to an embodiment of the present disclosure.

Referring to FIG. 4, a communication method based on an access network device comprises the following operations.

In operation S410, the access network device sends the information accessed by the UE through the RN to the MME.

The operation of the access network device sending the information accessed by the UE through an RN to MME comprises the following operations. The RN or the DeNB sends the accessed information to the MME, wherein the accessed information includes one or more of an indication of the RN or the mobile RN, an identity of RN, and a TAI list supported by the RN.

In operation S420, the access network device sends the non-access stratum message received from the MME to the UE.

The non-access stratum message includes a TAI list of the RN cell where the UE is located.

As illustrated in one embodiment of the present disclosure, the access network device comprises, but is not limit to, the RN and the DeNB.

For example, the DeNB obtains information accessed by the UE through the RN in the following one or more procedures: an initial UE message initiated by the RN to which the UE belongs; a handover request confirmation message initiated by the RN to which the UE belongs; a handover informing message initiated by the RN to which the UE belongs; path switch request message initiated by the RN to which the UE belongs; a S1 establishing process initiated by the RN to which the UE belongs; a connecting process of the RN initiated by the RN to which the UE belongs; an RN instruction contained in the handover request confirmation message by the RN to which the UE belongs; and a determination of whether the cell currently accessed by the UE is the RN cell according to an initial configuration.

In the establishing process of the S1 interface, the DeNB sends the information about the TAI list supported by RN under the DeNB to the MME.

It may be that an RN directly reports the information accessed by the UE through the RN to the MME. For example, the RN informs the MME of the information accessed by the RN through an initial UE message. Through the establishing procedure of the S1 between the RN and the MME, the MME obtains the TAI list supported by the RN.

In addition, when paging the UE is to be performed, the method further comprises the following operations. The DeNB receives a paging 1 message sent by the MME; the DeNB sends a paging 2 message to the RN which supports the TAC or the TAI in the TAI list in the paging message received from the MME; and the RN sends a paging 3 message to the UE. Alternatively, the RN sends a paging 3 message to the UE in the cell in the TAI received from the DeNB.

When the TAI of the cell where multiple relatively stationary UEs are located is contained in a TAI list of the UEs, the uplink TAU processes shall not be initiated by the UEs by sending a TAI list of an RN cell where the UE is located to the UE, so that it enables a reduction of the unnecessary signaling and network jamming simultaneously to improve the paging efficiency and to promote the network performance.

Figure 5:
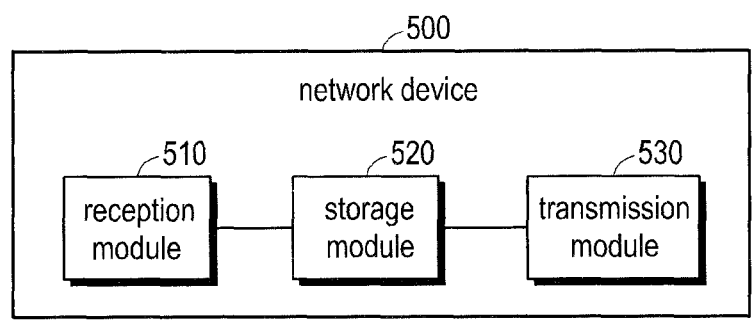
FIG. 5 is a structural schematic view of a network device according to an embodiment of the present disclosure.

FIG. 5 is a structural schematic view of a network device according to an embodiment of the present disclosure.

Referring to FIG. 5, and corresponding to the above mentioned methods, a network device 500 includes a reception module 510, a storage module 520 and a transmission module 530.

The reception module 510 is used to receive information accessed by a UE through an RN.

The reception module 510 receiving information accessed by a UE through an RN comprises the reception module 510 receiving the accessed information reported by the RN or the DeNB, wherein the accessed information includes one or more of an indication of the RN or the mobile RN, an identity of the RN and a TAI list supported by the RN.

The storage module 520 is used to record the information accessed by the UE through the RN. The storage module 520 further records the DeNB where the RN is located accessed by the UE. When the DeNB where the RN is located accessed by the UE is changed, the storage module 520 updates the information about the DeNB where the RN is located accessed by the UE.

The transmission module 530 is used to send a TAI list of an RN cell where the UE is located.

In the establishing process of the S1 interface, the reception module 510 receives report information from the DeNB in order to obtain a TAI list supported by the RN under the DeNB.

The reception module 510 may directly receive the information accessed by the UE through RN reported by the RN. For example, the RN sends an initial UE message to inform the reception module 510 of the information accessed by the UE through the RN. In the creating process of the S1 interface, the reception module 510 obtains the TAI list supported by the RN. Then the transmission module 530 sends the TAI list of the RN cell where the UE is located to the UE.

When paging the UE is to be performed, two procedures are provided according to the present disclosure.

In the first procedure, the transmission module 530 sends a paging 1 message to the DeNB where the UE is located or to the eNB which supports the TAI in the TAI list sent to the UE; the DeNB sends the paging 2 message to the RN which supports the TAC or the TAI in the paging message received from the MME or the eNB sends paging message to the cell which supports the TAC or the TAI in the paging message received from the MME; and the RN sends a paging 3 message. Alternatively, the RN sends a paging 3 message to the UE in the cell in the TAI received from the DeNB.

In the second procedure, the transmission module 530 sends the paging 1 message to the eNB or the RN that supports the TAI in the TAI list sent to the UE; the eNB or the RN sends a paging 2 message in the cell in the TAC or the TAI received from the MME or the DeNB to the UE.

When the UE departs from the RN, the storage module 520 may update the information accessed by the UE through the RN, and the transmission module 530 may send a updated TAI list to the UE.

In a specific application, the network device 500 may be a MME. When the RN is switched, if the information about the DeNB accessed by the RN where the UE is located is changed, the MME or the relocated MME stores the updated DeNB information accessed by the RN where the UE is located. Generally, the initial MME is defined as a source MME, and the relocated MME is defined as a target MME, that is, when the transmission module 530 of the source network device 500 receives the information of switching the RN where the UE is located, the transmission module 530 of the source network device 500 sends the information about the UE served by the RN to the target network device 500; and the storage module 520 of the target network device 500 updates the DeNB accessed by the RN where the UE is located as the target DeNB.

When an RN switching happens, if the information about the UE is changed, the transmission module 530 sends the updated information to the UE.

Specifically, the transmission module 530, when sending the updated information to the UE, may send a NAS message that includes the updated information to the UE; or the transmission module 530 sends S1 message to a DeNB, and the DeNB sends the updated information to the UE through the RN.

The above mentioned network device 500 includes, but is not limit to, a MME device. When the TAI of the cell where multiple relatively stationary UEs are located is contained in a TAI list of the UEs, the uplink TAU processes shall not be initiated by the UEs by sending a TAI list of an RN cell where the UE is located to the UE, so that it enables a reduction of the unnecessary signaling and network jamming simultaneously to improve the paging efficiency and to promote the network performance.

Figure 6:
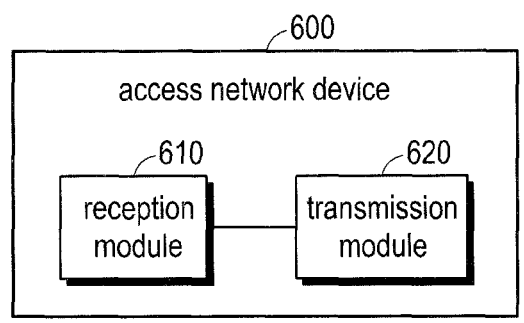
FIG. 6 is a structural schematic view of an access network device according to an embodiment of the present disclosure.

FIG. 6 is a structural schematic view of an access network device according to an embodiment of the present disclosure.

Referring to FIG. 6, and corresponding to the above mentioned methods, an access network device 600 includes a reception module 610 and a transmission module 620.

In a specific network, the access network device 600 includes, but is not limit to, an RN or a DeNB.

Specifically, the reception module 610 is used to receive information accessed by a UE through an RN; and the reception module 610 obtains the information accessed by the UE through the RN in one or more procedures as follows: an initial UE message initiated by the RN to which the UE belongs; a handover request confirmation message initiated by the RN to which the UE belongs; a handover informing message initiated by the RN to which the UE belongs; a path switch request message initiated by the RN to which the UE belongs; a S1 establishing process initiated by the RN to which the UE belongs; a connecting process of the RN initiated by the RN to which the UE belongs; an RN instruction contained in the handover request confirmation message by the RN to which the UE belongs; and a determination of whether the cell currently accessed by the UE is the RN cell according to an initial configuration.

The transmission module 630 is used to send the information accessed by the UE through the RN to the MME, and send the information received from the MME to the UE.

The transmission module 630 sends the information accessed by the RN to the MME, wherein the information includes one or more of an indication of the RN or the mobile RN, an identity of the RN and a TAI list supported by the RN.

In the establishing process of the S1 interface, the transmission module 630 sends the information about the TAI list supported by the RN under the access network device 600 to the MME.

When paging the UE is to be performed, the reception module 610 may receive a paging 1 message sent by the MME; the transmission module 630 may send a paging 2 message to the RN which supports the TAC or the TAI in the paging message; and the RN may send a paging 3 message to the UE in the cell which is in the TAC or the TAI in the TAI list received in the paging message from the MME or DeNB.

The access network device 600 sends a non-access stratum message received from the MME to the UE, wherein the non-access stratum message includes a TAI list of an RN cell where the UE is located. When the TAI of the cell where multiple relatively stationary UEs are located is contained in a TAI list of the UEs, the uplink TAU processes may not be initiated by the UEs, so that it enables a reduction of the unnecessary signaling and a network jamming simultaneously to improve the paging efficiency and to promote the network performance.

Various application contexts are incorporated into the various embodiments as disclosed below for further explanation of the present disclosure. It should be understood that an introduction of a device entity, such as MME, RN, DeNB or UE is merely exemplary for convenience of description, and thus the device entity cannot be regarded as limiting the present disclosure.

Figure 7:
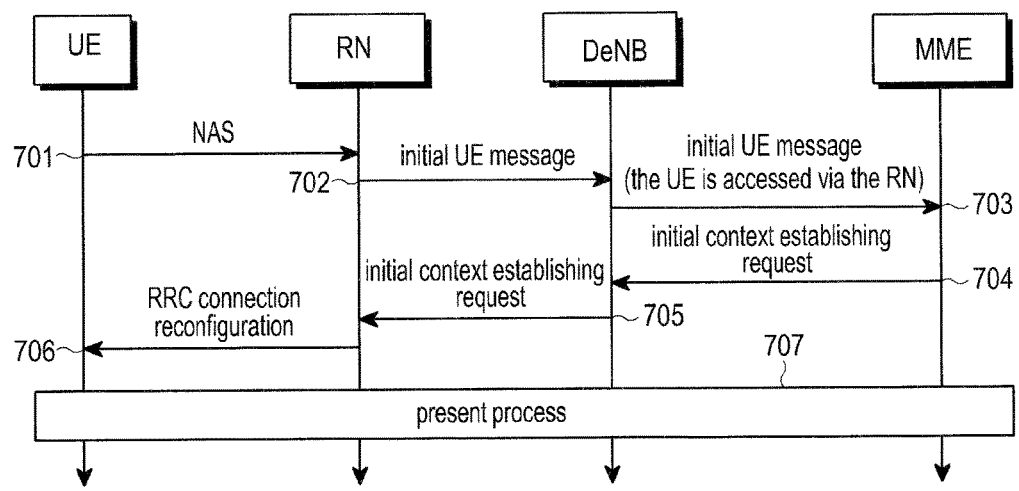
FIG. 7 is a flowchart of an application context 1 showing that a User Equipment (UE) accesses a network initially by an RN cell according to an embodiment of the present disclosure.

An Application Context 1:

FIG. 7 is a flowchart of an application context 1 showing that a UE accesses a network initially by an RN cell according to an embodiment of the present disclosure.

Referring to FIG. 7, the application context 1 is a flowchart showing that when a UE initially accesses a network through an RN, an RN or a DeNB informs a MME that a UE is accessed by the RN. In operation 701, the UE sends a NAS message to the RN. In operation 702, the RN sends the received NAS message to the DeNB by a S1 message, such as an initial UE message or a Radio Resource Control (RRC) message.

The DeNB obtains the information accessed by the UE through the RN in the following procedures. As a procedure 1, from the initial UE message, the DeNB has acknowledged that what is connected below is an RN. Currently, only the RN can send the initial UE message to the DeNB. As a procedure 2, through the establishing process of the S1, the DeNB has acknowledged that what is connected below is an RN. Currently, only the RN can send a S1 establishing request to the DeNB, and there is a Un interface only between the RN and the DeNB. As a procedure 3, in an RN access process (in the establishing process of the RRC access), the RN can send an RN instruction to the DeNB. The DeNB can acknowledge that an RN node is below according to the RN instruction of RRC layer. As a procedure 4, the initial UE message contains an RN indication, and the DeNB knows that the UE is accessed by the RN according to this indication. In such a procedure, the other types of nodes will be accessed to the network through the DeNB in the future, and also this procedure is available as sending a S1 creating request and an initial UE message to the DeNB. And furthermore, such procedure does not depend on information about the other protocol layer.

As a procedure 5, through initial configuration, it is acknowledged that the cell currently accessed by the UE is the cell of the RN.

DeNB knows the identification of the RN and TAI list supported by the RN in the creating process of the S1. Alternatively, through the above process, the initial UE message, S1 creating request, eNB configuration update, or RRC connection establishing process may include the identification of a RN and the TAI list supported by the RN to inform the DeNB in correspondence with the TAI list supported by the RN.

In operation 703, the DeNB sends the received NAS message to the MME. The DeNB informs the MME of the information accessed by the UE through the RN. The DeNB may inform the MME of the information accessed by the UE through the RN according to the RN indication or the RN identity. For instance, the DeNB may inform the MME of the information accessed by the UE through the RN as sending the initial UE message which may include the RN indication or the RN identity in the NAS message. The information accessed by the UE through the RN further may contain the TAI list supported by the RN.

The MME stores the information accessed by the UE through the RN and stores the DeNB accessed through the RN.

In operation 704, the MME sends an initial context request message which includes NAS information to the DeNB. For example, when the MME receives an attach request (Attach) or a TAU request with an activate flag, the MME sends the initial context request message including a NAS message to the DeNB. If the MME receives the TAU request without any activate flag, in this operation, the MME may send a downlink NAS transmission message which includes the NAS message to the DeNB. The NAS message contains a TAI list which is sent to the UE. The TAI list is a TAI list supported by the RN where the UE is located. The MME can obtain the TAI supported by the RN in several procedures as described below. As a procedure 1, a MME is configured to know the TAI list supported by a certain RN, which may be a corresponding relationship between an RN identity and a TAI list for example. As a procedure 2, informing the MME of the TAI list supported by the RN in the operation 703. The DeNB obtains the TAI list supported by RN through S1 establishing process. Alternatively, the RN may inform the DeNB of the TAI list supported by RN through operation 702.

Figure 14:
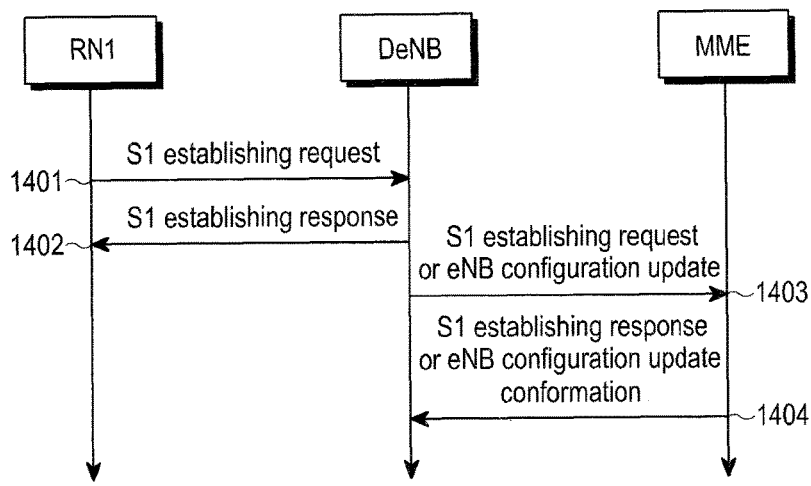
FIG. 14 is a flowchart of an application context showing that an MME obtains a Tracing Area Identification (TAI) supported by an RN according to an embodiment of the present disclosure.

As a procedure 3, through the S1 establishing process, as shown in FIG. 14.

FIG. 14 is a flowchart of an application context showing that an MME obtains a TAI supported by an RN according to an embodiment of the present disclosure.

Referring to FIG. 14, in operation 1401, the RN sends a S1 establishing request message which includes a TAI list supported by the RN to the DeNB. In operation 1402, the DeNB sends a S1 establishing response message to the RN. It should be noted that there is no absolute sequence between the operations 1402 and 1403. For example, operation 1403 may be executed before the operation 1402. In operation 1403, the DeNB sends a S1 establishing request or an eNB configuration update message which includes an RN identity and a TAI list supported by RN to the MME. In operation 1404, the MME sends a S1 establishing response or an eNB configuration update confirming message to the DeNB.

Returning to FIG. 7, in operation 705, the DeNB sends an initial context establishing request message which includes the information received in the operation 704 to the RN. In operation 706, the RN sends a RRC connection reconfiguration message which includes the NAS message in the operation 704 to the UE, and the UE stores the received TAI list. In operation 707, executing the existing process, such as the existing Attach and a TAU process.

In this case, after receiving the TAI list, when the UE is stationary compared with the RN, to the UE does not need to initiate the TAU process since the TAI in the cell of the RN takes no change.

Figure 8:
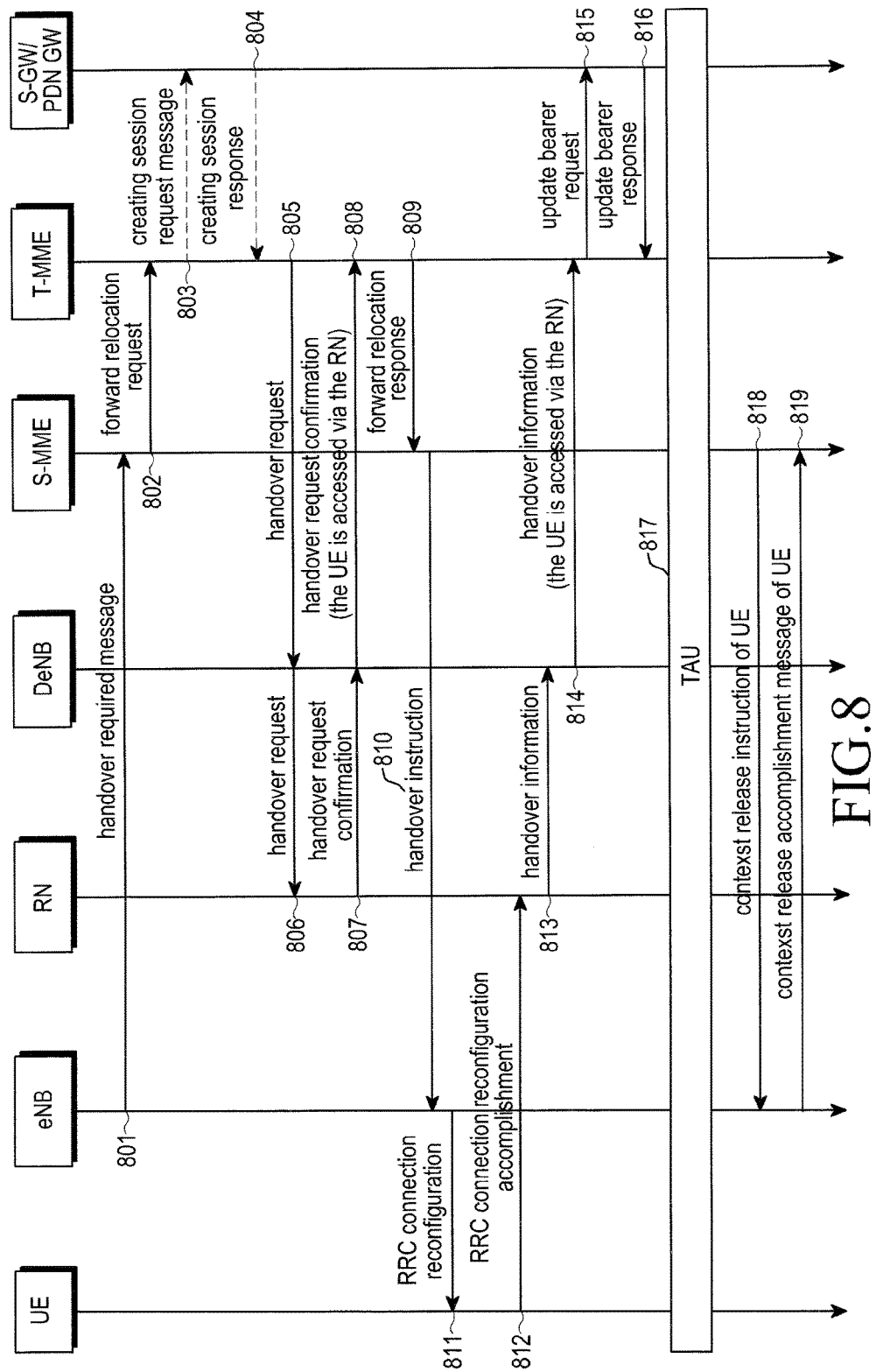
FIG. 8 is a flowchart of an application context 2 showing that a UE accesses an RN cell through S1 handover according to an embodiment of the present disclosure.

An Application Context 2:

FIG. 8 is a flowchart of an application context 2 showing that a UE accesses an RN cell through S1 handover according to an embodiment of the present disclosure.

Referring to FIG. 8, the application context 2 is a flowchart showing that when a UE accesses an RN cell by the S1 handover, an RN or a DeNB informs a MME of the information which the UE is accessed through the RN. A description of FIG. 8 is provided below.

In operation 801, the eNB decides to initiate a handover for the UE. The eNB sends a handover required message to an S-MME. In operation 802, the S-MME sends a forward relocation request message to a T-MME. In operation 803, the T-MME determines whether it is required to relocate an S-GW for the UE. When relocation of a Serving GateWay (S-GW) is to be performed, the T-MME sends a creating session request message to a new S-GW. In operation 804, the S-GW sends a creating session response message to the T-MME. In operation 805, the T-MME sends a handover request message to a DeNB. In operation 806, the DeNB sends a handover request message to the RN. In operation 807, the RN allocates radio resources. The RN sends a handover request confirmation message to the DeNB.

The DeNB may know that the UE is accessed by the RN cell in several procedures below. As a procedure 1, according to the handover request confirmation message, the DeNB has acknowledged that what is attached to the DeNB is an RN. Currently, only the RN can send the handover request confirmation message to the DeNB. As a procedure 2, through the S1 establishing process, the DeNB has acknowledged that what is attached below is the RN. Currently, only the RN can send an S1 establishing request to the DeNB, and a Un interface only exists between RN and DeNB. As a procedure 3, in the RN attach process (in RRC attach establishing process), the RN sends an RN instruction to the DeNB. The DeNB can acknowledge that an RN node is located below according to the RN instruction of RRC layer. As a procedure 4, the initial UE message contains an RN indication, according to which the DeNB knows that the UE is accessed by the RN. In such a procedure, the other types of nodes will be accessed to the network through the DeNB in future, and also this procedure is available for sending a S1 creating request and an initial UE message to the DeNB. Furthermore, such procedure does not depend on the information in the other protocol layer for more convenient examination. As a procedure 5, through initial configuration, it is acknowledged that the cell currently accessed by the UE is the cell of the RN.

The DeNB knows the identity of RN and TAI list supported by the RN in the process of S1 creating. Or through the above process, the initial UE message, S1 creating request, eNB configuration update, or RRC connection establishing process may include the identity of RN and the TAI list supported by the RN to inform DeNB in correspondence with the TAI list supported by the RN.

In operation 808, the DeNB sends a handover request confirmation message to a T-MME. The DeNB informs the MME of the information accessed by the UE through the RN. The DeNB informs the MME of the information accessed by the UE through the RN according to the RN indication or the RN identity. For instance, the DeNB may inform the MME of the information accessed by the UE through the RN in the handover request confirmation message and contain the RN indication or the RN identity in the handover request confirmation message. The information accessed by the UE through the RN may include the TAI list supported by the RN.

The MME stores the information accessed by the UE through the RN and stores the DeNB accessed by the RN.

In operation 809, a T-MME sends a forward relocation response to a S-MME.

In operation 810, the S-MME sends a handover command message to an eNB.

In operation 811, the eNB sends a RRC connection reconfiguration message to a UE.

In operation 812, the UE sends a RRC connection reconfiguration accomplishment message to an RN.

In operation 813, the RN sends a handover informing message to a DeNB.

In operation 814, the DeNB sends a handover informing message to the T-MME.

As illustrated in this application context, another method is provided to inform the MME of the information accessed by the UE through the RN and the DeNB attached by the RN by the operations 813 and/or 814. The specific procedures are as same as in the operations 807 and 808. The DeNB may acknowledge that the UE is accessed by the RN cell in the following procedures. As a procedure 1, according to the handover informing message, the DeNB has acknowledged that what is attached below is an RN. Currently, only the RN can send the handover message to the DeNB. As a procedure 2, through the S1 establishing process, the DeNB has acknowledged that what is attached is an RN. Currently, only the RN can send an S1 establishing request to the DeNB, and a Un interface only exists between the RN and the DeNB. As a procedure 3, in the RN attach process (in a RRC attach establishing process), the RN sends an RN instruction to the DeNB. The DeNB can acknowledge that an RN node is located below according to the RN instruction of RRC layer, As a procedure 4, the initial UE message contains an RN indication, according to which the DeNB knows that the UE is accessed by RN. In such a procedure, the other types of nodes will be accessed to the network through the DeNB in future, and also this procedure is available as sending a S1 creating request and an initial UE message to the DeNB. Furthermore, such procedure does not depend on information in the other protocol layer for more convenient examination. As a procedure 5, through initial configuration, it is acknowledged that the current cell is the cell of the RN.

The DeNB knows the identification of the RN and TAI list supported by the RN in the process of S1 creating. Or through the above process, the initial UE message, S1 creating request, eNB configuration update, or RRC connection establishing process may include the identification of the RN and the TAI list supported by the RN to inform the DeNB in correspondence with the TAI list supported by the RN.

The DeNB informs the MME of the information accessed by the UE through the RN. The DeNB may inform the MME of the information accessed by the UE through the RN according to the RN indication or the RN identity. For instance, the DeNB may inform the MME of the information accessed by the UE through the RN in the handover request confirmation message and contain the RN indication or the RN identity in the handover request confirmation message. The information accessed by the UE through the RN may include the TAI list supported by the RN.

The MME stores the information accessed by the UE through the RN and stores the DeNB accessed by the RN.

In operation 815, a T-MME sends an update bearer request message to a S-GW/Packet Data Network GateWay (PDN GW).

In operation 816, the S-GW/PDN GW sends an update bearer response message to a T-MME.

In operation 817, executing a TAU process. The TAU accepting message which is sent to the UE by the MME contains a TAI list which is sent to the UE. The TAI list is the TAI list supported by the RN where the UE is located. The MME obtains the TAI list supported by the RN in three procedures. The procedures 1 and 3 are as same as the application context as illustrated in FIG. 7, so the details thereof will be omitted. The procedure 2 is that the TAI list supported by the RN is informed to the MME in the operations 808 or 814. The DeNB obtains the TAI list supported by the RN through the S1 establishing process. Alternatively, the RN may inform the DeNB of the TAI list supported by the RN by the operations 807 or 813.

In operation 818, the S-MME sends a context release instruction message about the UE to the eNB.

In operation 819, the eNB sends a context release accomplishment message about the UE to the S-MME.

Figure 9:
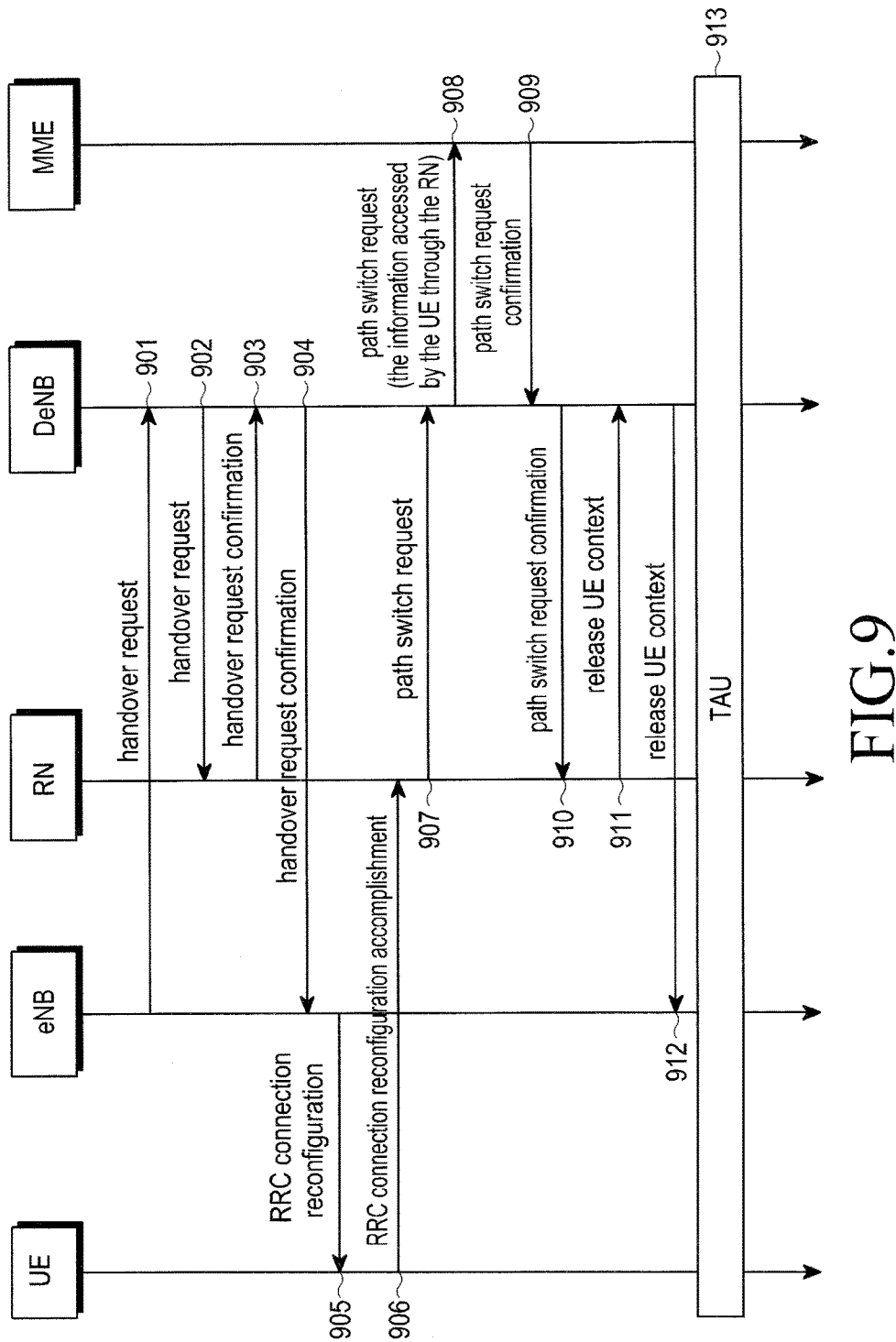
FIG. 9 is a flowchart of an application context 3 showing that a UE accesses an RN cell through X2 handover according to an embodiment of the present disclosure.

An Application Context 3:

FIG. 9 is a flowchart of an application context 3 showing that a UE accesses an RN cell through X2 handover according to an embodiment of the present disclosure.

Referring to FIG. 9, when the UE accesses the RN cell by X2 handover, the RN or the DeNB informs the MME of the information accessed by the UE through the RN, as will be described.

In operation 901, the eNB decides to initiate a handover to the UE. The eNB sends a handover request message to the DeNB.

In operation 902, the DeNB sends a handover request message to an RN.

In operation 903, the RN allocates resources to the UE, and sends a handover request confirmation message to the DeNB.

In operation 904, the DeNB sends a handover request confirmation message to the eNB.

In operation 905, the eNB sends a RRC connection reconfiguration message to the UE.

In operation 906, the UE sends a RRC connection reconfiguration accomplishment message to the RN.

In operation 907, the RN sends a path switch request message to the DeNB.

The DeNB may acknowledge that the UE is accessed by the RN in the following several procedures. As a procedure 1, according to a handover request confirmation message, the DeNB has acknowledged that what is attached below is an RN. Currently, only the RN can send a path switch request confirmation to the DeNB. As a procedure 2, through a S1 establishing process, the DeNB has acknowledged that what is attached below is an RN. Currently, only an RN can send an S1 establishing request to the DeNB, and a Un interface only exists between the RN and the DeNB. As a procedure 3, in the RN attach process (in a RRC attach establishing process), the RN sends RN instruction to the DeNB. The DeNB can acknowledge that an RN node is located below according to the RN instruction of RRC layer. As a procedure 4, the path switch request message contains an RN instruction, according to which the DeNB knows that the UE is accessed by RN. In such a procedure, the other types of nodes will be accessed to the network through DeNB in future, and also this procedure is available as sending a S1 creating request and an initial UE message to the DeNB. Furthermore, such procedure does not depend on information in the other protocol layer. As a procedure 5, through initial configuration, it is acknowledged that the cell currently accessed by the UE is the cell of the RN.

The DeNB knows identification of the RN and TAI list supported by the RN in the process of S1 creating. Or through the above process, the initial UE message, S1 creating request, eNB configuration update, or RRC connection establishing process may include the identification of the RN and the TAI list supported by the RN to inform DeNB in correspondence with the TAI list supported by the RN.

In operation 908, the DeNB sends a path switch request confirmation message to MME, and informs the MME of the information accessed by the UE through the RN. The DeNB informs the MME of the information accessed by the UE through the RN according to the RN indication or the RN identity. For instance, the DeNB may inform the MME of the information accessed by the UE through the RN in the handover request confirmation message and contain the RN indication or the RN identity in the handover request confirmation message. The information accessed by the UE through the RN may include the TAI list supported by the RN.

The MME stores the information accessed by the UE through the RN and the DeNB is accessed by the RN.

In operation 909, a MME sends a path switch request confirmation message to a DeNB.

In operation 910, the DeNB sends a path switch request confirmation message to an RN.

In operation 911, the RN sends a release UE context to the DeNB.

In operation 912, the DeNB sends a release UE contest to the eNB.

The operations 911 and 912 are used to release the context information about the UE on the eNB. Alternatively, the other release process may be applied without affecting the main contents of the present disclosure.

In operation 913: the TAU process is executed. The TAU accepting message sent to the UE by the MME contains a TAI list sent to the UE. The TAI list is the TAI list supported by the RN where the UE is located. The MME obtains the TAI list supported by the RN in three procedures. The procedure 1 and 3 are as same as the application context 1 as illustrated in FIG. 7, so that the details will be omitted.

The procedure 2 is that the MME of the TAI list supported by the RN is informed in the operation 908. The DeNB obtains the TAI list supported by the RN through the S1 establishing process. Alternatively, the RN may inform the DeNB of the TAI list supported by the RN by the operation 907.

Figure 10:
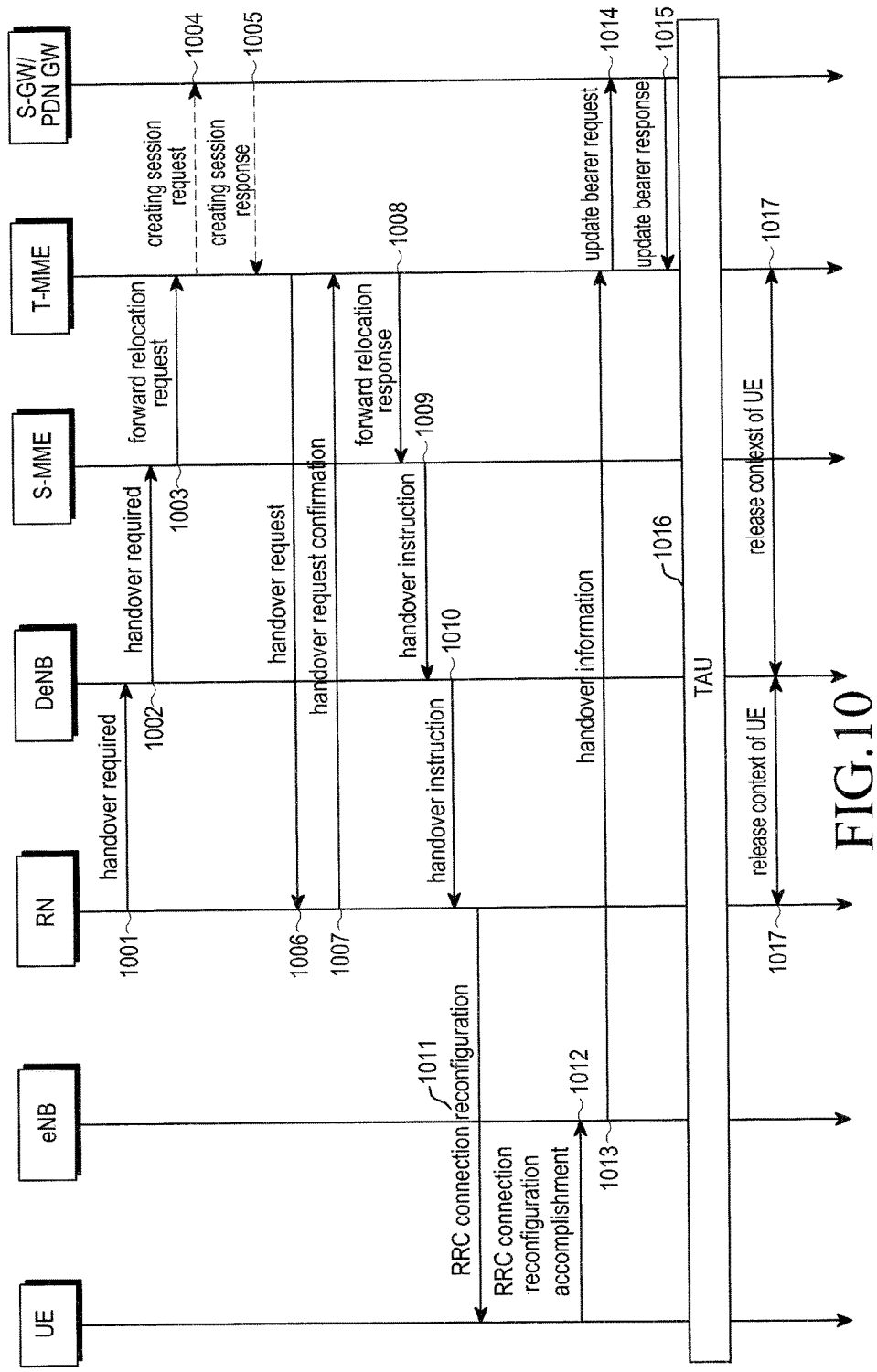
FIG. 10 is a flowchart of an application context 4 showing that a Mobile Management Entity (MME) updates information while a UE is moving away from an RN according to an embodiment of the present disclosure.

An Application Context 4:

FIG. 10 is a flowchart of an application context 4 showing that a MME updates information while a UE is moving away from an RN according to an embodiment of the present disclosure.

Referring to FIG. 10, while the UE is displaced from the RN, the MME may update the stored information and the TAI list of the UE. As shown in FIG. 10, illustration of the operations not associated with the present disclosure will be omitted herein for convenience in description. In operation 1001, an RN sends a handover required message to a DeNB. In operation 1002, the DeNB sends a handover required message to a S-MME. In operation 1003, the S-MME sends a forward relocation request message to the T-MME. In operation 1004, the T-MME determine whether to relocate S-GW/PDN GW for the UE, if it is desirable to send a create session request message to the S-GW/PDN GW. In operation 1005, the S-GW/PDN sends an creating session response message to the T-MME. In operation 1006, the T-MME sends a handover request message to the eNB. In operation 1007, the eNB allocates resources. The eNB sends a handover request confirmation message to the T-MME. In operation 1008, the T-MME sends a forward relocation response message to the S-MME. In operation 1009, the S-MME sends a handover command message to the DeNB. In operation 1010, the DeNB sends a handover command message to the RN, In operation 1011, the RN sends a RRC connection reconfiguration message to the UE. In operation 1012, the UE sends a RRC connection reconfiguration accomplishment message to the eNB. In operation 1013, the eNB sends a handover informing message to the T-MME.

The MME knows that the UE has displaced the RN according to the handover informing message or the handover request confirmation message, i.e. the information does not contain instruction of the UE in the RN, or the instruction of the mobile or the instruction without RN. When the UE returns back into an idle mode, while the MME is to initiate paging to the UE, the MME pages the UE complying with the present paging mechanism according to the TAI list sent to the UE. In operation 1014, the T-MME sends an update bearer request message to the S-GW/PDN GW. In operation 1015, the S-GW/PDN GW sends an update bearer response message to the T-MME. In operation 1016, the TAU process is executed. The TAU accepting message about the UE sent by the MME includes the updated TAI list sent to the UE.

When the MME intends to page the UE, the MME sends a paging message to such an eNB which supports the TAI within the new TAI list sent to the UE. The eNB pages the UE in such a cell which is in the TAI in the new TAI list sent to the UE.

In operation 1017, the UE context information about the UE in the DeNB and the RN are released.

Figure 11:
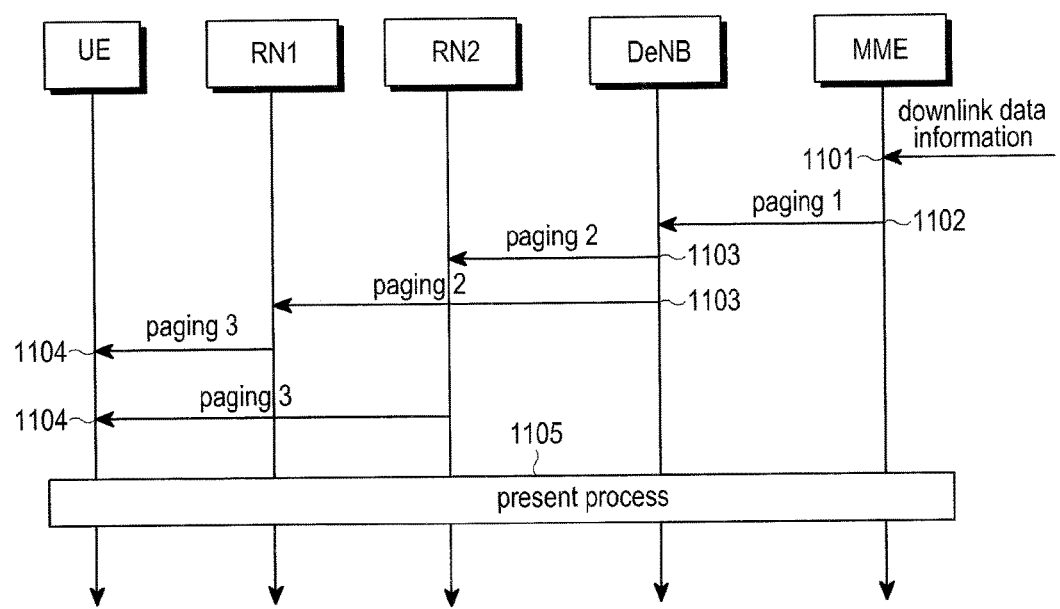
FIG. 11 is a flowchart of an application context 5 showing that a network pages a UE according to an embodiment of the present disclosure.

An Application Context 5:

FIG. 11 is a flowchart of an application context 5 showing that a network pages a UE according to an embodiment of the present disclosure.

Referring to FIG. 11, an application context 5 of a network paging a UE is shown.

In step 1101, a MME receives downlink data information.

In operation 1102, the MME sends a paging 1 message to the DeNB/eNB that supports the TAI in the TAI list sent to the UE. According to the UE context, the MME knows the TAI list sent to the UE. The paging 1 message includes a TAI list.

In operation 1103, the DeNB sends a paging 2 message to an RN attached to the DeNB and supporting the TAI in the TAI list contained in the paging message received from the MME. The paging 2 message includes the TAI list. The DeNB also sends a paging 2 message to the cell, which is in the TAI in the TAI list in the paging message received from the MME. The paging 2 message from the DeNB to the RN and the paging 3 message from the RN/eNB to the UE are different messages.

The paging 2 message from the DeNB to the RN is a S1AP message according to 3rd Generation Partnership Project (3GPP) Technical Standard (TS) 36.413. The paging 3 message from the RN/eNB to the UE is a RRC message according to TS 36.331. The paging 2 message from the DeNB to the RN can be the same as the paging 1 message from the MME to the DeNB or can be different messages, which does not impact the main contents of this disclosure.

In operation 1104, the RN receiving the paging 2 message sends a paging 3 message to the UE in the cell controlled by the RN. Alternatively, the RN sends a paging 3 message to the UE in the cell in the TAI received in the paging 2 message from the DeNB.

In operation 1105, the UE executes the present paging response process, such as a service request process.

Figure 12:
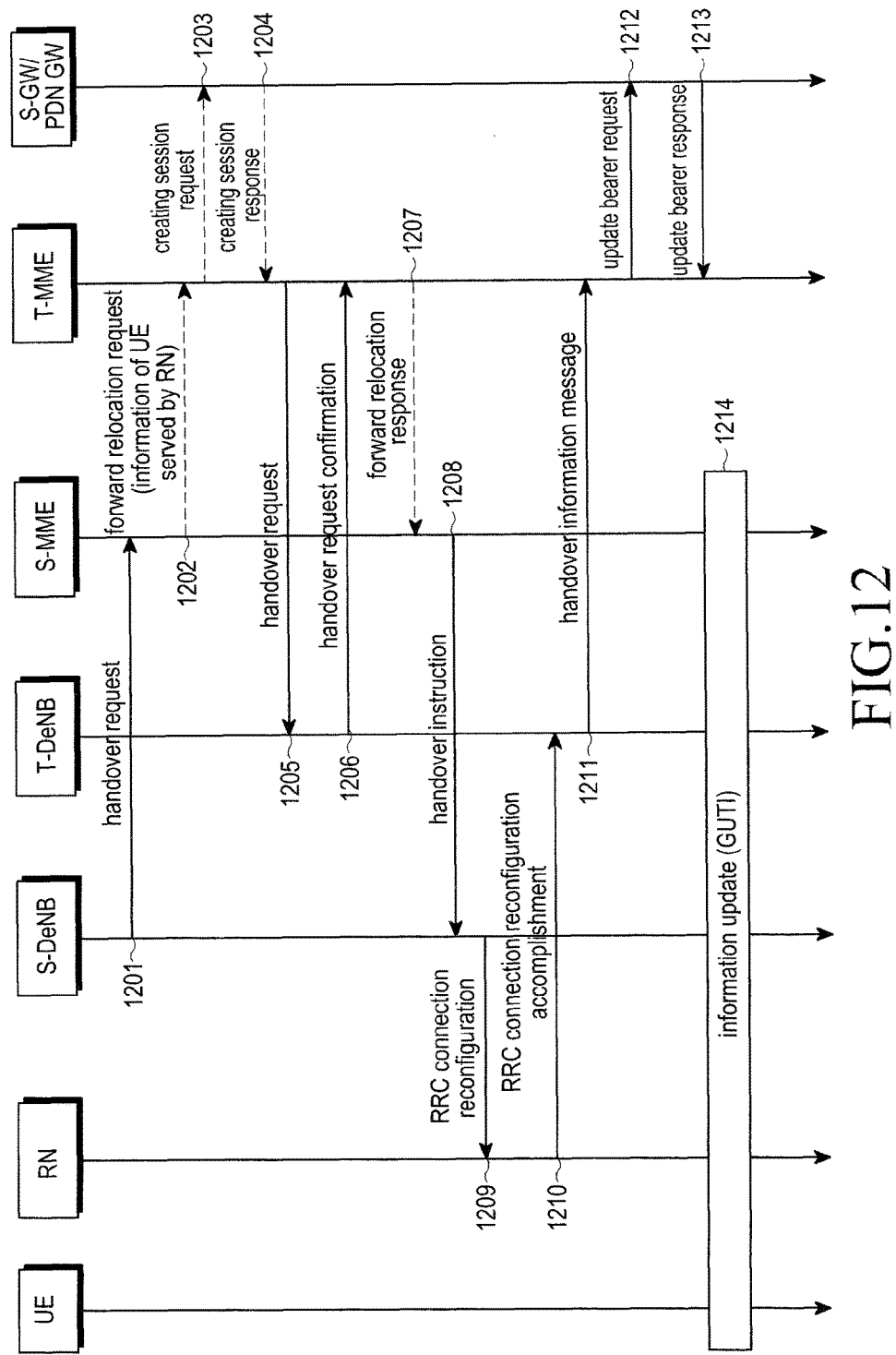
FIG. 12 is a flowchart of an application context 6 showing that an MME updates a Donor evolved Node B (DeNB) accessed by an RN during RN switching according to an embodiment of the present disclosure.

An Application Context 6:

FIG. 12 is a flowchart of an application context 6 showing that an MME updates a DeNB accessed by an RN during RN switching according to an embodiment of the present disclosure.

Referring to FIG. 12, in an RN moving process, a change is made to a Target DeNB (T-DeNB) from a Source DeNB (S-DeNB). This embodiment describes a process in which a MME updates the DeNB of the stored RN during the RN moving. Description of the operations not related with the present disclosure will be omitted for conciseness in description. The process comprises the following operations. In operation 1201, the S-DeNB decides to initiate a handover for the RN. The S-DeNB sends a handover required message to the S-MME (that is the MME which serves to the RN and the UE served by the RN).

The MME updates the DeNB information about the RN. The information about the UE served by the RN can be obtained by operation 703, operation 808 or operation 814, operation 908. And the MME updates the information about the DeNB accessed by the RN where the UE is located.

In operation 1202, if the MME is to be re-located, the S-MME selects a target T-MME for the RN or the UE of the RN. The S-MME may select the same target MME for the RN and the UE of the RN. The S-MME sends a forward relocation request message including the information of the UE served by the RN to a T-MME. The information about the UE served by the RN contains a context of the UE served by the RN and the DeNB of the RN. For example, the information about the UE served by the RN can be obtained by operation 703, operation 808, or operation 814, operation 908.

The S-MME can update the information about the DeNB accessed by the RN where the UE is located, i.e. update to be the target DeNB from the source DeNB, and then send the updated information to the T-MME. Or the S-MME directly sends the stored information about the UE served by the RN to the T-MME, the T-MME updates the information about the DeNB accessed by the RN where the UE is located, i.e., update to be the target DeNB from the source DeNB. And furthermore, the operation of this process will not exist without relocation of the MME.

In operation 1203, the T-MME determines whether it is required to relocate a S-GW for each UE served by the RN. When a new S-GW is selected, the T-MME sends a creating session response message to the new S-GW. Herein certain signaling between the S-GW and PDN GW will be omitted for conciseness in explanation. In the case where the MME is not relocated, the S-MME determines whether to relocate the S-GW for each UE if a new S-GW is selected. If the S-GW is not to be reallocated, the operation 1203 and the operation 1204 of the process will not be executed.

The message contains a bearer context information including an uplink PDN GW address connected to each PDN and a Tunnel Endpoint Identifier (TEID). The target S-GW allocates the S1-U interface uplink S-GW address and TEID.

If the S-GW and PDN GW of the RN are a separate entity frame (S-GW/PDN GW and the RN are non-colocated), the T-MME determines whether there is need to change the S-GW that serves the RN. If so, the same process as above mentioned will be executed.

In operation 1204, the S-GW sends a create session response message to the T-MME, the message including that the S-GW allocates the S1-U interface uplink S-GW address and TEID.

In operation 1205, the T-MME sends a handover request message to a T-DeNB, the message including the identification information and the bearer information about the RN as the UE.

It should be explained that the operation 1205 and the operation 1201 are not necessary for the method, and thereby may be omitted.

In operation 1206, the T-DeNB is a radio resource of a Un interface which is allocated to RN for allocating a Un interface.

The T-DeNB sends a handover request confirmation message to T-MME, the message including the information of RN as the UE, such as eNB UE S1 AP ID, MME UE S1 AP ID, accepted E-RAB information and the failed E-RAB information.

In operation 1207, the T-MME sends a forward relocation response to the S-MME, the message including the information received in the operation 1206.

In operation 1208; the S-MME sends a handover command message to the S-DeNB, the message including the information of RN as the UE, such as eNB UE S1 AP ID and MME UE S1 AP ID of the RN.

In operation 1209; the S-DeNB sends a RRC connection reconfiguration message to the RN, the message including mobile control information about the RN as UE.

The RN stores the above information received.

In operation 1210, the RN sends a RRC connection reconfiguration accomplishment message to the T-DeNB.

In operation 1211, the T-DeNB sends a handover informing message to the T-MME.

In operation 1212, for each UE served by the RN, the T-MME sends an update bearer request message to a S-GW/PDN GW of the UE. If the S-GW is re-selected for the UE in the operation 1203, the T-MME sends the update bearer request message to a target S-GW/PDN GW. When the S-GW is re-selected, the PDN GW cannot be changed. Herein, the description of the signaling between the S-GW and the PDN GW will be omitted for conciseness in explanation.

If the S-GW and PDN GW of the RN are a separate entity frame (S-GW/PDN GW and the RN are non-colocated), the T-MME sends a modification bearer request message to a T-S-GW/PDN GW, the message including the information about the RN as the UE. The T-S-GW/PDN GW of the RN will send the update bearer response message in the operation 1213 to the T-MME.

In operation 1213, the S-GW/PDN GW of the UE sends an update bearer response message to the T-MME.

In operation 1214, a network side updates the information about the UE served by the RN, for example GUTI. In the method of the present disclosure, this operation is not a necessary operation, that is, the method of this embodiment may not contain this operation.

Figure 13:
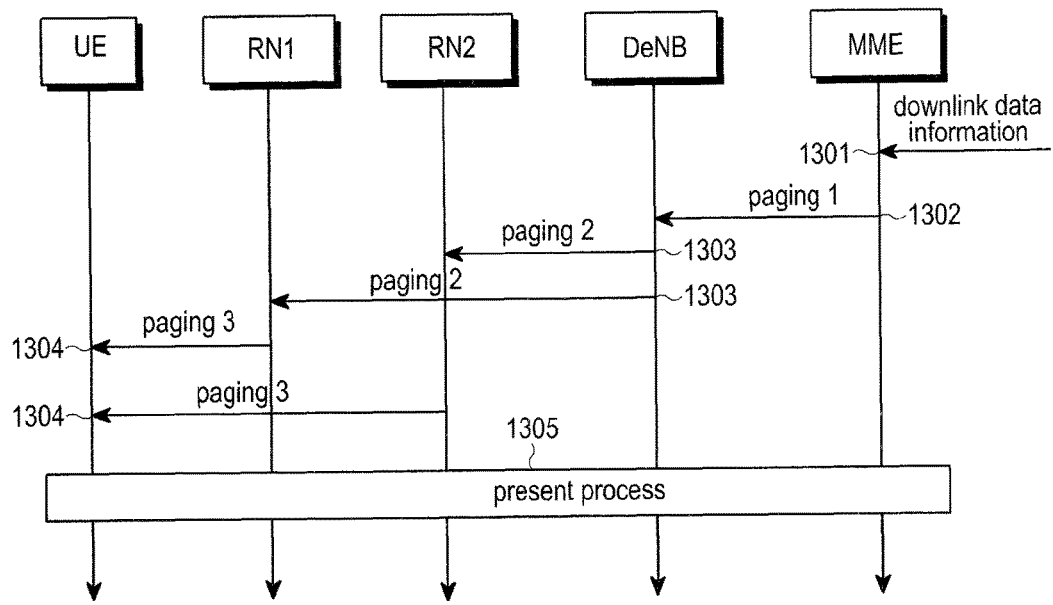
FIG. 13 is a flowchart of an application context 7 showing that a network pages a UE according to an embodiment of the present disclosure.

An Application Context 7:

FIG. 13 is a flowchart of an application context 7 showing that a network pages a UE according to an embodiment of the present disclosure.

Referring to FIG. 13, an application context 7 in which a UE is paged over the network is shown.

In operation 1301, the MME receives the downlink data information.

In operation 1302, if the UE is covered by the RN, the MME sends a paging 1 message to the DeNB of the UE according the stored information about the UE. According to the various embodiments as shown in FIG. 7, FIG. 8, FIG. 9 and/or FIG. 12, the MME may obtain the DeNB accessed by the RN where the UE is located, wherein the paging message includes a TAI list. The TAI list is the same as that which the MME sent to the UE. The UE may camp in the TAI list without a TAU procedure.

In operation 1303, the DeNB sends a paging 2 message to an RN attached to the DeNB and supporting the TAI in the TAI list contained in the paging message received from the MME, wherein the paging messaging includes the TAI list.

In operation 1304, the RN receiving the paging 2 message sends a paging 3 message to the UE in the cell controlled by the RN. Alternatively, the RN sends a paging 3 message to the UE in the cell supporting the TAI contained in the paging message received from the DeNB. The paging 2 message from the DeNB to the RN and the paging 3 message from the RN/eNB to the UE are different messages.

The paging 2 message from the DeNB to the RN is an S1AP message according to 3GPP TS36.413. The paging 3 message from the RN/eNB to the UE is an RRC message according to TS36.331. The paging 2 message from the DeNB to the RN can be the same with the paging 1 message from the MME to the DeNB or can be different messages, which does not impact the main contents of this disclosure.

In operation 1305, the UE executes the present paging response process, such as a service request process.

Figure 15:
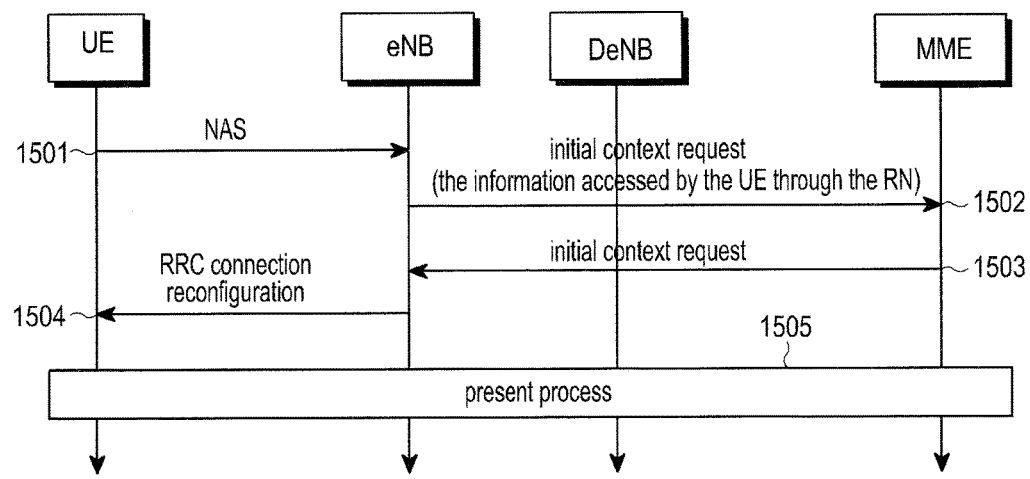
FIG. 15 is a flowchart of an application context 8 showing that a UE initially accesses a network through an RN cell according to an embodiment of the present disclosure.

An Application Context 8:

FIG. 15 is a flowchart of an application context 8 showing that a UE initially accesses a network through an RN cell according to an embodiment of the present disclosure.

Referring to FIG. 15, an application context 8 is shown in which the UE accesses the network initially through the RN cell and where the RN informs the MME of the information accessed by the UE through the RN. The details thereof are presented below.

In operation 1501, the UE sends a NAS message to the RN.

In operation 1502, the RN sends the received NAS message to the MME according to the S1 information such as the initial UE message, wherein the S1 information is transmitted transparently through the DeNB. The RN informs the MME of the information accessed by the UE through the RN. The RN may inform the MME of the information accessed by the UE through the RN according to the RN indication or RN identity, for example, informing the MME of the information accessed by the UE through the RN according to the initial UE message in which the NAS message is sent, or including the RN indication or the RN identity in the initial UE message.

The MME knows the RN identity and the TAI list supported by the RN through the S1 creating process. Or through the above process, the MME is informed to be corresponding to the TAI list supported by the RN in the initial UE message including the RN identity and the TAI list supported by the RN.

The MME stores the information accessed by the UE through the RN and stores the TAI list supported by the RN.

In operation 1503, the MME sends an initial context request message which includes a NAS message to the RN. For example, when the MME receives an attach request (Attach) or a TAU request with an activate flag, the MME is required to send the initial context request message including the NAS message to the DeNB.

If the MME receives the TAU request without any activate flag, in this operation, the MME may send a downlink NAS transmission message which includes the NAS message to the DeNB. The NAS message contains a TAI list which is sent to the UE. The TAI list is a TAI list supported by the RN where the UE is located.

The MME can obtain the TAI supported by the RN in several procedures as described below. As a procedure 1, a MME is configured to know the TAI list supported by a certain RN, which may be a corresponding relationship between an RN identity and a TAI list for example.

As a procedure 2, informing the MME of the TAI list supported by the RN in the operation 1502.

As a procedure 3, through the S1 establishing process, the RN informs the MME of the TAI list supported by the RN, and the S1 message is transmitted transparently through the DeNB.

In operation 1504, the RN sends a RRC connection reconfiguration message which includes the NAS message in the operation 704 to the UE, and the UE stores the received TAI list.

In operation 1505, the existing process is executed, such as the existing Attach and a TAU process.

In this case, after receiving the TAI list, when the UE is stationary compared with the RN, the UE does not need to initiate the TAU process since the TAI in the cell of the RN takes no change.

When the MME is going to page the UE, for example, the MME receives the downlink data information, executing the following operations.

The MME sends the paging message to such eNB/RN which supports the TAI in the TAI list sent to the UE according to the stored information about the UE, wherein the paging message includes the TAI list.

After receiving the paging message, the eNB/RN sends a paging message to the UE in the cell controlled by the eNB/RN; or the eNB/RN sends a paging message to the UE in the cell in the TAI contained in the paging message received from the MME or DeNB.

The UE executes the present paging response process, such as a service request process.

In the case where the switch occurs in the RN, if the information about the UE is changed, particularly the network configuration information is changed, such as a change of the GUTI, change of the relevant information about the UE may be informed in two procedures, As a procedure 1, the MME (which is a destination MME when MME relocation occurs) sends a NAS message which includes an updated information (such as GUTI) of a UE information to the UE in order to update the UE. The updated information may further include TAI list and equivalent PLMN list.

The present GUTI reallocation instruction may be used to update the UE information.

The UE stores the above received information.

The UE sends an acknowledgement message. For example, the acknowledgement message is the of the GUTI reallocation accomplishment message. And such operation is selectable.

As a procedure 2, the MME (which is a destination MME when MME relocation occurs) sends a UE information by S1 message to the DeNB in order to update the UE. The message may send all the information of UE under the RN to the RN. The message includes information of each UE, such as GUTI of the UEs, and further includes a TAI list of the UEs. The message may be sent by the RN associated signaling.

The DeNB sends UE information by S1 message in order to update the RN. The message may send the information of all UEs under the RN to the RN. The message includes the information of each UE, such as GUTI of the UEs, and further includes a TAI list of the UE.

The RN sends each UE information received above to the corresponding UE by the RRC message.

To this end, informing the UE of the change of the relevant information thereof is finished.

It is understandable to those skilled in the art that all or part of the operation of the foregoing various embodiments may be implemented by hardware instructed by a computer program. The program may be stored in a non-transitory computer-readable storage medium. When being executed, the program performs all or part of the operations in foregoing method various embodiments.

In addition, all functional units in the various embodiments of the present disclosure may be integrated into a process module, or exist independently, or two or more of such units are integrated into a module. The integrated module may be hardware module, a software module, or a module that is a combination thereof. When being implemented as a software module and existing or applied as an independent product, the integrated module may also be stored in a non-transitory computer-readable storage medium.

The non-transitory computer-readable storage medium may be a Read-Only Memory (ROM), magnetic disk or Compact Disk (CD).

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for communicating by a mobile management entity (MME), the method comprising:
receiving relay node (RN) information including information for identifying an RN accessed by a user equipment (UE), the RN information including a first tracing area identification (TAI) list supported by the RN;
sending, to the UE, a second TAI list including at least one TAI of an RN cell where the UE is located, the second TAI list being sent to the UE to determine whether to omit a tracing area update (TAU) procedure between the UE and the MME; and
if the at least one TAI of the RN cell is contained in the first TAI list, omitting the TAU procedure for the UE, and sending, to the UE through the identified RN supporting the at least one TAI, a paging message.

2. The method of claim 1,
wherein the receiving of the RN information accessed on the RN accessed by the UE comprises receiving the RN information as reported by one of the RN and a base station (BS), and
wherein the RN information further includes one or more of an indication of the RN and an identity of the RN.

3. The method of claim 2, wherein the RN information is information on the RN accessed by the UE via at least one of:
an initial UE message initiated by the RN to which the UE belongs;
a handover request confirmation message initiated by the RN to which the UE belongs;
a handover informing message initiated by the RN to which the UE belongs;
a path switch request message initiated by the RN to which the UE belongs;
an S1 establishing process initiated by the RN to which the UE belongs;
a connecting process of the RN initiated by the RN to which the UE belongs;
an RN instruction contained in the handover request confirmation message by the RN to which the UE belongs; or
a determination of whether the cell currently accessed by the UE is the RN cell according to an initial configuration.

4. The method of claim 3, wherein in the S1 establishing process, the MME receives report information from the BS in order to obtain a TAI list supported by the RN under the BS.

5. The method of claim 1, further comprising:
when the UE departs from the RN, updating the RN information, and sending an updated TAI list to the UE.

6. The method of claim 1, wherein if information about the UE is changed at a moment of a RN switching, the MME or a relocated MME sends updated RN information to the UE.

7. The method of claim 6, wherein the sending of the updated RN information to the UE comprises one of:
sending a non access stratum (NAS) message that includes the updated information to the UE; or
sending an S1 message to a base station (BS) and the BS sends the updated RN information to the UE through the RN.

8. The method of claim 1, further comprising:
storing base station (BS) information on a BS accessed by the RN cell where the UE is located.

9. The method of claim 8, wherein when paging of the UE is to be performed, the method further comprises:
sending, by the MME, a paging type 1 message to the BS accessed by the RN cell where the UE is located;
sending, by the BS, a paging type 2 message to the RN that supports a tracking area code (TAC) or a TAI in the TAI list in a paging message received from the MME; and
sending, by the RN, a paging type 3 message to the UE.

10. The method of claim 1, wherein upon receiving a handover message at the RN cell where the UE is located, the MME updates a base station (BS) accessed by the RN cell where the UE is located.

11. The method of claim 10, wherein when paging of the UE is to be performed, the method further comprises:
sending, by the MME, a paging type 1 message to the BS accessed by the RN cell where the UE is located;
sending, by the BS, a paging type 2 message to the RN that supports a tracking area code (TAC) or a TAI in the TAI list in a paging message received from the MME; and
sending, by the RN, a paging type 3 message to the UE.

12. The method of claim 1, further comprising:
when a source MME receives information about switching the RN cell where the UE is located, sending, by the source MME, information about the UE served by the RN to a target MME, and updating, by the target MME, a base station (BS) accessed by the RN cell where the UE is located as a target BS.

13. The method of claim 12, wherein when paging of the UE is to be performed, the method further comprises:
sending, by the MME, a paging type 1 message to the BS accessed by the RN cell where the UE is located;
sending, by the BS, a paging type 2 message to the RN that supports a tracking area code (TAC) or a TAI in the TAI list in a paging message received from the MME; and
sending, by the RN, a paging type 3 message to the UE.

14. A method for communicating by a user equipment (UE), the method comprising:
identifying relay node (RN) information including information for identifying an RN accessed by the UE, the RN information including a first tracing area identification (TAI) list supported by the RN;
receiving from a mobile management entity (MME), a second TAI list including at least one TAI of an RN cell where the UE is located; and
if the at least one TAI of the RN cell is contained in the first TAI list, omitting a tracing area update (TAU) procedure for the MME, and receiving a paging message sent through the identified RN supporting the at least one TAI by the MME.

15. The method of claim 14, the RN information further includes one or more of an indication of the RN and an identity of the RN.

16. The method of claim 15, wherein the RN information is information on the RN accessed by the UE via one or more of:

an initial UE message initiated by the RN to which the UE belongs;
a handover request confirmation message initiated by the RN to which the UE belongs;
a handover informing message initiated by the RN to which the UE belongs;
a path switch request message initiated by the RN to which the UE belongs;
an S1 establishing process initiated by the RN to which the UE belongs;
a connecting process of the RN initiated by the RN to which the UE belongs;
an RN instruction contained in the handover request confirmation message by the RN to which the UE belongs; or
a determination of whether the cell currently accessed by the UE is the RN cell according to an initial configuration.

17. A network device, comprising:
a transceiver; and
a processor configured to control to:
receive relay node (RN) information including information for identifying an RN accessed by a user equipment (UE), the RN information including a first tracing area identification (TAI) list supported by the RN,
send, to the UE, a second TAI list including at least one TAI of an RN cell where the UE is located, the second TAI list being sent to the UE to determine whether to omit a tracing area update (TAU) procedure between the UE and the MME, and
if the at least one TAI of the RN cell is contained in the first TAI list, omit the TAU procedure for the UE, and send, to the UE through the identified RN supporting the at least one TAI, a paging message.

18. An user equipment (UE), comprising:
a transceiver; and
a processor configured to control to:
identify relay node (RN) information on including information for identifying an RN accessed by the UE, the RN information including a first tracing area identification (TAI) list supported by the RN,
receive, from a mobile management entity (MME), a second TAI list including at least one TAI of an RN cell where the UE is located, and
if the at least one TAI of the RN cell is contained in the first TAI list, omit a tracing area update (TAU) procedure for the MME, and receive a paging message sent through the identified RN by the MME.

* * * * *